(12) United States Patent
Konabe

(10) Patent No.: US 7,112,383 B2
(45) Date of Patent: Sep. 26, 2006

(54) BINDER FOR ELECTRODES

(75) Inventor: Kazuo Konabe, Shimizu (JP)

(73) Assignee: DuPont-Mitsui Fluorochemicals Co. Ltd., Tokyo (JP)

( * ) Notice: Subject to any disclaimer, the term of this patent is extended or adjusted under 35 U.S.C. 154(b) by 230 days.

(21) Appl. No.: 10/717,161

(22) Filed: Nov. 19, 2003

(65) Prior Publication Data

US 2005/0107553 A1  May 19, 2005

(51) Int. Cl.
*H01M 8/12* (2006.01)

(52) U.S. Cl. .................. 429/33; 525/242; 525/274; 526/247; 526/250; 429/309

(58) Field of Classification Search ........... 526/250, 526/247; 525/274, 242; 429/33
See application file for complete search history.

(56) References Cited

U.S. PATENT DOCUMENTS

| | | | | |
|---|---|---|---|---|
| 4,115,481 A | * | 9/1978 | Finlay et al. | 525/199 |
| 4,197,366 A | * | 4/1980 | Tamura et al. | 429/333 |
| 4,211,868 A | * | 7/1980 | Erdman | 544/221 |
| 4,722,773 A | * | 2/1988 | Plowman et al. | 205/525 |

FOREIGN PATENT DOCUMENTS

| | | | |
|---|---|---|---|
| DE | 2849311 A1 | | 5/1980 |
| GB | 2408959 A | * | 6/2005 |
| JP | 37-4643 | | 6/1962 |
| JP | 46-014466 | | 4/1971 |
| JP | 55049862 A | * | 4/1980 |
| JP | 56-026242 B | | 8/1981 |
| JP | 63-236258 A | | 10/1988 |
| JP | 4-249860 A | | 9/1992 |
| JP | 1994-044964 A | | 2/1994 |
| JP | 11279505 A | | 10/1999 |
| JP | 2000040504 A | | 2/2000 |
| JP | 2004-31179 | * | 1/2004 |

* cited by examiner

*Primary Examiner*—Ling-Sui Choi
*Assistant Examiner*—Henry S. Hu

(57) ABSTRACT

The present invention is directed to a binder for electrode materials which comprises tetrafluoroethylene polymer fine particles having an average particle size of not more than about 0.20 μm and having a standard specific gravity of not more than about 2.20, wherein a mixture prepared from said fine particles with about 17% by weight of the total mixture of an extrusion coagent, when subjected to the measurement of an extrusion pressure by a rheometer, exhibits under the conditions of a draw ratio of 100 to 1 and an extrusion speed of 18±2 mm/min, an extrusion pressure of not less than about 220 kg/cm$^2$.

10 Claims, No Drawings

BINDER FOR ELECTRODES

BACKGROUND OF THE INVENTION

1. Field of the Invention

The present invention relates to binder used for binding electrode material such as carbon and the like, specifically to fluoropolymer-based binder suitable for manufacture of battery electrodes.

2. Description of Related Art

Recently, demands have been rising for small size and suitably portable electrical and electronic devices, such as audio tape recorders, cameras, integrated video tape recorders, personal computers, cellular telephones, and the like. This has created a need for small high performance batteries. Among new types of batteries that have been commercialized are nickel hydrogen, and lithium, in addition to traditional lead batteries and/or nickel-cadmium batteries. In addition, development and commercialization are also in progress on relatively large size electrical energy supply devices such as automotive fuel cells, and electrical double layer capacitors.

Materials for production of electrodes for constructing batteries are normally shaped into the preferred configuration using binders, said materials including manganese dioxide ($MnO_2$), nickel hydroxide [$Ni(OH)_2$], hydrogen occlusion alloys, lithium cobaltate ($LiCoO_2$), lithium nickelate ($LiNiO_2$), lithium manganate ($LiMn_2O_4$), carbon, and graphite. Binders have been based on fluoropolymers, which exhibit excellent chemical resistance and heat resistance as well as binding properties.

For example, Unexamined Japanese Patent Application Publication Kokai S63-236258 discloses the use of an aqueous dispersion of polytetrafluoroethylene (PTFE) for binding positive electrode materials for primary lithium batteries such as $MnO_2$, acetylene black, and graphite. Japanese Patent Application Publication H6-10980 describes examples of binding manganese oxide for an air battery, carbon black, and activated carbon using aqueous PTFE dispersion.

Also, examples are known in which polyvinylidene fluoride (PVDF) is used as a binder. Kokai H6-44964 describes mixing a conductor such as a hydrogen occlusion alloy, or nickel carbonyl powder, for a nickel hydrogen battery with a PVDF solution, fabricating the mixture into sheet form, and using the product as an electrode. In the case of a lithium ion secondary battery, as described in Kokai H4-249860, a positive electrode material comprised of a lithium-containing oxide such as $LiCoO_2$ and graphite, and a carbonaceous material as a negative electrode material, are each mixed an N-methyl-pyrrolidone solution of PVDF to be processed into sheet form; here again PVDF is used as a binder.

PTFE particles exhibit the property whereby their surfaces tend to fibrillate when subjected to low shear force, so that mixing them with another powdery material causes them to fibrillate easily. Although fibril formation improves the binding force with electrode materials, fibrils may entangle with each other and hinder uniform mixing. Therefore, uniform mixing is conventionally promoted by converting PTFE from a powder to an aqueous colloidally dispersed product. However, use of PTFE in the form of aqueous dispersion requires, in the final stage, a step of removing by heating, the large amount of water and surfactants contained therein as stabilizers. In addition, the added surfactant and water sometimes adversely affect battery properties. For example, $LiNiO_2$, which is used as a positive electrode material in secondary lithium ion batteries, readily reacts with water, which makes it difficult in practice to use with an aqueous PTFE dispersion.

Since PVDF is soluble in organic solvents, it can be mixed with electrode materials without using water or surfactant. However, the fact that the PVDF is soluble in organic solvents means that the PVDF is sensitive to swelling in the organic electrolytes commonly used in batteries, such as propylene carbonate, dimethoxyethane, γ-butyrolactone. A swollen electrode can degrade battery performance. PVDF is also said to be somewhat lower in binding strength than is PTFE.

Performance of electrical and electronic devices can be enhanced by improving battery properties such as useful life and improved discharge characteristics. Each time secondary batteries are subjected to charging and discharging, the electrodes undergo expansion and contraction, so that if the strength of the binder is inadequate, active materials may slough off from the electrode, resulting in a gradual decline in battery life.

Binder strength can be increased by increasing the amount of PTFE or PVDF binder used. However, fluoropolymers are insulators, and their presence hinders the flow of electricity in the battery. Therefore, for increased battery performance it is desirable to use less fluoropolymer binder, not more.

It is an object of this invention to provide a binder for electrodes which can be uniformly mixed with the electrode material and which exhibits high binding strength at a low levels of addition.

BRIEF SUMMARY OF THE INVENTION

The present invention is directed to a binder for electrode materials which comprises tetrafluoroethylene polymer fine particles having an average particle size of not more than about 0.20 μm and having a standard specific gravity of not more than about 2.20, wherein a mixture prepared from said fine particles with about 17% by weight of the total mixture of an extrusion coagent, when subjected to the measurement of an extrusion pressure by a rheometer, exhibits under the conditions of a draw ratio of 100 to 1 and an extrusion speed of 18±2 mm/min, an extrusion pressure of not less than about 220 $kg/cm^2$.

The tetrafluoroethylene based polymer is preferably polytetrafluoroethylene or a copolymer of tetrafluoroethylene with at least one comonomer selected from the group consisting of fluoro(alkyl vinyl ethers) represented by formula $CF_3-(CF_2)_n-O-CF=CF_2$ (where n is 0, 1, or 2), hexafluoropropylene, and perfluorobutyl ethylene.

The present invention also relates to a process for making an electrode comprising:

mixing electrode materials with a binder to form an electrode/binder mixture, said binder comprising tetrafluoroethylene based polymer fine particles having an average particle size of not more than about 0.20 μm and having a standard specific gravity of not more than about 2.20, wherein a mixture prepared from said fine particles with about 17% by weight of the total mixture of an extrusion coagent, when subjected to the measurement of an extrusion pressure by a rheometer, exhibits under the conditions of a draw ratio of 100 to 1 and an extrusion speed of 18±2 mm/min, an extrusion pressure of not less than about 220 $kg/cm^2$; and molding the electrode/binder mixture into an electrode.

DETAILED DESCRIPTION OF THE INVENTION

The binder for electrode materials for this invention comprises fine tetrafluoroethylene based polymer particles having an average particle size of not more than about 0.20 μm, preferably about 0.10 to about 0.18 μm and having a standard specific gravity of not more than about 2.20, preferably about 2.12 to about 2.19.

Here, the average particle size is measured by light scattering. The method calls for irradiating tetrafluoroethylene based polymer fine particles prepared in a dispersion state (primary particles) with laser light, thereby measuring the particle size of the fine particles by means of the extent of modulation of frequencies of the scattered light. One example used a particle size measurement instrument (a product made by Nikkiso Co., Ltd., trade name Microtrack UPA 150, Model no. 9340) where the sample was diluted with water so that the loading index of the sample dispersion became 0.5 to 1.5. Data input were: the sample configuration selected as non-spherical (With the "Spherical Particles" set at "No") along with the refractive index of the sample (1.37) and the refractive index of the water solvent (1.33). Average particle size was measured under such conditions.

The tetrafluoroethylene based polymer fine particles have an average particle size of about 0.20 μm or less in this invention, smaller than the average particle size of the usually manufactured polymer particles, so that the number of polymer particles per unit mass is greater. This facilitates uniform dispersion of the polymer fine particles in the active ingredients that constitute an electrode, and at the same time the greater surface area for polymer fine particles results in increased contact area between the polymer fine particles and the active ingredients, so that this in turn is postulated to increase the number of fibrillating fibers on their surfaces when the polymer fine particles are subjected to shear force, thereby effecting enhanced binding strength.

Standard specific gravity can be determined in accordance with ASTM D-1457. Since it is difficult to directly measure the molecular weight of PTFE, the molecular weight is indirectly estimated from the standard specific gravity. The higher the standard specific gravity, the lower the molecular weight, or the lower the standard specific gravity, the higher the molecular weight. Since a standard PTFE has a standard specific gravity of about 2.21 as used in ordinary applications, the tetrafluoroethylene polymer having a standard specific gravity of not more than about 2.20 used in this invention belongs to a relatively high molecular weight region. The tetrafluoroethylene polymer normally assumes a lamella structure, in which the higher the molecular weight, the easier it is for the lamella structure to be loosened with a small force, resulting in fibrillation and enhancing the binding strength to electrode materials.

The tetrafluoroethylene based polymer used in this invention is a polymer comprising tetrafluoroethylene as a repeating unit, which may be a tetrafluoroethylene homopolymer or a copolymer of tetrafluoroethylene with a fluorine-containing monomer terminated with a double bond.

Tetrafluoroethylene homopolymer can be prepared normally by emulsion polymerization of tetrafluoroethylene in the presence of a radical polymerization catalyst; details of the method of manufacture are described in Japanese Patent Application Publications S374643, 46-14466, and 56-26242.

When the tetrafluoroethylene based polymer is a copolymer of tetrafluoroethylene and a fluorine-containing monomer, the comonomer fluorine-containing monomer includes chlorotrifluoroethylene, hexafluoropropylene, fluoroalkyl ethylene, perfluoroalkyl ethylene, fluoroalkyl-fluorovinyl ether and the like. The particularly preferred comonomer is at least one comonomer selected from the group consisting of fluoroalkyl-fluorovinyl ether compounds, hexafluoropropylene, and perfluorobutyl ethylene.

The fluoro(alkyl vinyl ethers) are those represented by the following formula: $CF_3-(CF_2)_n-O-CF=CF_2$ (Where n is 0, 1, or 2), including, for example, trifluoromethyl fluorovinyl ether, pentafluoroethyl fluorovinyl ether, and heptafluoropropyl fluorovinyl ether, also known as perfluoro(methyl vinyl ether), perfluoro(ethyl vinyl ether), and perfluoro(propyl vinyl ether), respectively.

One or more comonomers may be used in the above copolymer. The comonomer content in the copolymer should preferably be about 0.001 to 2% by weight, more particularly, about 0.01 to 0.5% by weight. From such copolymer, one can obtain fine particles with small average particle size and low standard specific gravity useful as a binder for electrode materials according to this invention. This copolymer can be manufactured using the same process used in manufacturing tetrafluoroethylene homopolymers, by emulsion polymerization of tetrafluoroethylene and a fluorine-containing monomer in the polymerization system, along with radical polymerization catalyst.

The tetrafluoroethylene polymer fine particles can be used in the form of a fine powder prepared by coagulating and drying the emulsion polymer, as an aqueous dispersion prepared by concentrating and stabilizing an emulsion from emulsion polymerization, or as a nonaqueous dispersion prepared by dispersing the polymer fine particles in a nonaqueous medium.

The fine particles according to this invention are those that not only have an average particle size and standard specific gravity within the aforementioned ranges, but also which exhibit an extrusion pressure of about 220 kg/cm$^2$ or greater, preferably about 270 kg/cm$^2$ or greater, under the conditions disclosed in the next paragraph.

For measurement of extrusion pressure, the test sample is prepared in the form of a paste mixture by compounding about 17% by weight, based on the total weight, of an extrusion coagent with the polymer fine particles. The extrusion coagent used is a lubricant manufactured from petroleum hydrocarbon containing at least about 90% of an isoparaffin component with the aromatic hydrocarbon and olefinic hydrocarbon components adjusted to not more than about 1%, and having an initial boiling point of at least 110° C. and dry point of not more than about 145° C., determined according to the method of ASTM D 1078. An example of such an extrusion coagent is made by ExxonMobil Chemical Co., under the trade name Isopar-E. The extrusion conditions are a draw ratio of 100 to 1 and extrusion speed of 18±2 mm/min. If the extrusion pressure of a test sample falls within the above range, the tetrafluoroethylene fine particles in that test sample will provide excellent adhesion properties to electrode materials.

The measurement of extrusion pressure by extrusion rheometer is carried out according to the following sequence:

(1) Adjust polymer dispersion resulting from emulsion polymerization with pure water to a 15% by weight concentration; place about 750 ml of the resultant dispersion in a 1 liter volume polyethylene container; vigorously shake the container by hand and coagulate the polymer. Separate the polymer powder from the water and dry the powder at 140° C. for 16 hours.

(2) Mix 100 g of the powder and 20.5 g (17.0% by weight) of a hydrocarbon lubricant (a product of ExxonMobil Chemical Co., trade name Isopar-E) as extrusion coagent in a polyethylene container to form a paste-like material; age at least 8 hours at room temperature (23±2° C.).

(3) Fill in a 30.9 mm ID cylinder with above aged paste mixture and then place a 55 kg load on the piston inserted into cylinder; hold for 1 minute.

(4) Remove the paste mixture from the cylinder; place it in a cylinder with an ID 31.7 mm equipped with an extrusion die (orifice 3.17 mm in diameter); extrude the paste mixture at an extrusion speed of 18 mm/min (ram speed) into a strand.

(5) Calculate the extrusion pressure (kg/cm$^2$) for the paste mixture by dividing the value of the extrusion pressure, when the pressure reaches equilibrium in the latter half of the extrusion operation, by the cylinder cross-sectional area.

The draw ratio for a rheometer (RR) is the ratio of the cross-sectional area (S2) of the cylinder filled with the paste mixture to the cross-sectional area (S1) of the die orifice, that is, S2/S1, which is for the example given as follows:

$$[(31.7/2)^2 \times \pi]/[(3.17/2)^2 \times \pi]=100/1.$$

In the extrusion experiment for the paste mixture with this rheometer, the tetrafluoroethylene polymer fine particles, under shear force, generate fibrils on the surface thereof and at the same time the fine particles undergo an orientation in the extruded direction generating inter-particle frictional force. Combination of the fibrillation and the generation of frictional force manifests itself as the extrusion pressure; in other words, the extrusion pressure is then controlled by the extents of fibrillation and frictional forces.

The tetrafluoroethylene polymer fine particles used in this invention are smaller in average particle size than that of the conventionally used particles, which results in a greater surface area and in turn, a greater contact area between the particles, resulting in a greater frictional force among particles. The tetrafluoroethylene polymer fine particles, which are a high molecular weight material, are in a readily fibrillating state. Combination of these two physical properties end up giving a high value in a measurement of extrusion pressure by a rheometer; the extrusion pressure must be at least 220 kg/cm$^2$ in order for the product to exhibit good binding properties with electrode materials.

The tetrafluoroethylene polymer fine particles used in this invention are binders for electrode materials, where the useable electrode materials include conventionally known materials as unmodified, such as carbonaceous materials, transition metal oxides, and complex oxides of lithium and transition metals. They are, for example, carbon, graphite, manganese dioxide ($MnO_2$), nickel hydroxide $Ni(OH)_2$, hydrogen occlusion alloys, lithium cobaltate ($LiCoO_2$), lithium nickelate ($LiNiO_2$), and lithium manganate ($LiMn_2O_4$).

Mixing such electrode materials with the binder of this invention followed by molding can produce electrodes, and the resulting electrodes can be used in primary batteries, secondary batteries, fuel cells, electrical double layer capacitors, and the like, particularly suitable for providing electrodes for primary or secondary batteries.

EXAMPLES

The present invention is now explained in detail by way of the following Examples, to which this invention is not limited:

Example 1

A 4L volume stainless steel (SUS 316) autoclave equipped with stirring blades and a temperature control jacket is charged with 60 g of paraffin wax, 1705 ml of deionized water, and 3 g of ammonium perfluorooctanoate. The system is purged five times with nitrogen gas to remove oxygen while it is heated to 80° C., evacuated, and fed with 5 ml of perfluorobutyl ethylene (PFBE). Then tetrafluoroethylene (TFE) is fed to maintain the internal pressure at 26 kg/cm$^2$ gage, with the stirring rate kept at 109 rpm and the internal temperature at 85° C.

Next, 100 ml of an aqueous solution of 300 mg of ammonium persulfate dissolved in 500 ml of deionized water is pump-fed to the autoclave. Five minutes after the start of reaction, 150 ml of a solution of 2667 mg of ammonium perfluorooctanoate dissolved in 400 ml of deionized water is pump-fed at a rate of 3 ml per minute. The reaction slowly starts and gradually accelerates, but the internal system temperature is controlled to remain constant at 80° C. and the agitation speed is kept constant at 109 rpm. TFE is continuously fed to keep the internal pressure of the autoclave constant at 26 kg/cm$^2$. When the amount of TFE consumed by the reaction after initiator addition reaches 670 g (the total amount fed including the pressure-fed portions is 948 g), 50 ml of a solution prepared by dissolving 64 ml of 29% aqueous ammonia in 400 ml of deionized water is pump-fed to allow the reaction to continue.

When the consumption of TFE reaches 1337 g (the total amount fed including the pressure-fed portions is 1497 g), the feeding of the TFE and agitation are stopped, the gas in the autoclave is vented to bring the autoclave to atmospheric pressure, and the contents are removed to finish the reaction. The resulting TFE/PFBE copolymer contains 0.18% by weight of PFBE. The dispersion has a solids concentration of 38.7% by weight, an average polymer particle size of 0.164 μm, and a standard specific gravity (SSG) of 2.148. The extrusion pressure when the paste is extruded with a rheometer according to the above-described procedure is 323 kg/cm$^2$.

Then, the binding properties of the resultant polymer fine particles are measured in terms of the amount of nickel flake loss. The amount nickel flake loss is an index used to judge the binding strength of the binder to the active ingredients and is determined by a binding strength measurement method described later. Nickel flake loss should not exceed about 1 wt %, preferably about 0.5 wt %, and more preferably about 0.1 wt %.

First, 10%, based on the weight of polymer, of a nonionic surfactant (trade name Triton X-100, distributed in Japan by Dow Chemical Co.,), is added to the dispersion of TFE/PFBE copolymer described above, and also 0.035% of citric acid. The resulting mixture is concentrated by heating to 70° C., which results in the formation of two layers: a concentrated aqueous polymer dispersion at the bottom and an aqueous Triton X-100 layer at the top. After removal of the supernatant liquid (the aqueous Triton X-100 layer), the same nonionic surfactant as the above is added to the concentrated aqueous polymer dispersion to bring it to 60% by weight of solids concentration with 6% by weight of the nonionic surfactant concentration based on polymer.

To the above dispersion is then added 20 g of nickel flakes. (1.07 μm thick, 96.2% by weight passing through a 325 mesh screen, from Nikko Fine Products, Ltd., Tokyo). The amount of the dispersion in terms of the weight of polymer added is 0.3% by weight of the nickel flakes. 15 g of pure water added and the contents are mixed for 6 minutes in a mortar. The mixing is carried out by hand at a rate of about 100 revolutions per minute.

A 2 mm thick aluminum sheet with a rectangular opening (60 mm×15 mm) is placed on aluminum foil; the above mixture is placed in the opening. The mixture is leveled to the thickness of the aluminum sheet. Next, incisions are made into the four sides of the 2 mm aluminum sheet with a cutter, and the aluminum sheet is slowly lifted to leave behind a test piece for the mixture. This test piece mixture is dried 2 hours at 150° C. and the weight of the dried test piece is measured.

On an automatic sifter (made by Fritsch Company, Germany, Type 03.501) is mounted a sieve with 1 mm openings, and a stainless steel SUS tray is placed underneath thereof; a test piece is placed on the sieve. With the amplitude dial set at 4, the instrument is allowed to vibrate for 15 seconds, then the weight of nickel flakes shaken off down to the tray is measured.

The amount of nickel flake detached is calculated according to the following equation:

Loss rate=$(W2/W1) \times 100(\%)$.

Where in the formula, W1 represents the weight (g) of the test piece before the vibration test; W2 the weight (g) of the nickel flakes shaken off.

The above dispersion showed a nickel loss of 0.05%.

Comparative Example 1

An operation similar to that of Example 1 is carried out to prepare a polymer dispersion except for replacing the TFE/PFBE copolymer used in Example 1 with a tetrafluoroethylene homopolymer having an SSG of 2.210 and an average particle size of 0.245 μm. The extrusion pressure and the amount of nickel flake loss are summarized in Table 1.

Comparative Example 2

An operation similar to that of Example 1 is carried out to prepare a polymer dispersion except for replacing the TFE/PFBE copolymer used in Example 1 with a tetrafluoroethylene, hexafluoropropylene, perfluorobutylethylene terpolymer having an SSG of 2.210 and an average particle size of 0.208 μm. The extrusion pressure and the amount of nickel flake loss are summarized in Table 1.

Comparative Example 3

An operation similar to that of Example 1 is carried out to prepare a polymer dispersion except for replacing the TFE/PFBE copolymer used in Example 1 with a tetrafluoroethylene homopolymer having a high molecular weight and large particle size: SSG 2.160; average particle size 0.270 μm. The extrusion pressure and the amount of nickel flake loss are summarized in Table 1.

TABLE 1

| | Standard specific gravity | Average Particle Size (μm) | Extrusion Pressure (kg/cm$^2$) | Nickel Loss (%) |
|---|---|---|---|---|
| Example 1 | 2.148 | 0.164 | 323 | 0.05 |
| Comp. Ex. 1 | 2.210 | 0.245 | 146 | 25.5 |
| Comp. Ex. 2 | 2.210 | 0.208 | 127 | 100 |
| Comp. Ex. 3 | 2.160 | 0.270 | 216 | 5.1 |

The Examples show that polymer dispersion whose molecular weight, as determined by standard specific gravity, and average particles size do not meet the requirements specified in this invention, show high nickel loss.

What is claimed is:

1. A binder for electrode materials which comprises fibrillatable tetrafluoroethylene based polymer fine particles having an average particle size of not more than about 0.20 μm and having a standard specific gravity of not more than about 2.20, wherein a mixture prepared from said fine particles with about 17% by weight of the total mixture of an extrusion lubricant coagent, when subjected to the measurement of an extrusion pressure by a rheometer, exhibits under the conditions of a draw ratio of 100 to 1 and an extrusion speed of 18±2 mm/min, an extrusion pressure of not less than about 220 kg/cm$^2$.

2. A binder for electrode materials as set forth in claim 1, wherein said tetrafluoroethylene based polymer is polytetrafluoroethylene or a copolymer of tetrafluoroethylene with at least one comonomer selected from the group consisting of fluoro(alkyl vinyl ethers) represented by formula $CF_3$—$(CF_2)_n$—O—CF=$CF_2$ (where n is 0, 1, or 2), hexafluoropropylene, and perfluorobutyl ethylene.

3. A binder for electrode materials as set forth in claim 1, wherein said tetrafluoroethylene based polymer has an average particle size of about 0.10 to about 0.18 μm.

4. A binder for electrode materials as set forth in claim 1, wherein said tetrafluoroethylene based polymer has a standard specific gravity of about 2.12 to about 2.19.

5. A binder for electrode materials as set forth in claim 1, wherein said tetrafluoroethylene based polymer has an extrusion pressure of about 270 kg/cm$^2$ or greater.

6. A process for making an electrode comprising:
mixing electrode materials with a binder to form an electrode/binder mixture, said binder comprising fibrillatable tetrafluoroethylene based polymer fine particles having an average particle size of not more than about 0.20 μm and having a standard specific gravity of not more than about 2.20, said mixing causing fibrillation of said fine particles to enhance the binding strength of said binder with said electrode material, wherein a mixture prepared from said fine particles with about 17% by weight of the total mixture of an extrusion lubricant coagent, when subjected to the measurement of an extrusion pressure by a rheometer, exhibits under the conditions of a draw ratio of 100 to 1 and an extrusion speed of 18±2 mm/min, an extrusion pressure of not less than about 220 kg/cm$^2$; and molding said electrode/binder mixture into said electrode.

7. A process for making an electrode as set forth in claim 6, wherein said tetrafluoroethylene based polymer is polytetrafluoroethylene or a copolymer of tetrafluoroethylene with at least one comonomer selected from the group consisting of fluoro(alkyl vinyl ethers) represented by formula $CF_3$—$(CF_2)_n$—O—CF=$CF_2$ (where n is 0, 1, or 2), hexafluoropropylene, and perfluorobutyl ethylene.

8. A process for making an electrode as set forth in claim 6, wherein said tetrafluoroethylene based polymer has an average particle size of about 0.10 to about 0.18 μm.

9. A process for making an electrode as set forth in claim 6, wherein said tetrafluoroethylene based polymer has a standard specific gravity of about 2.12 to about 2.19.

10. An electrode made by the process of claim 6.

* * * * *